United States Patent
Itoga (10) Patent No.: US 8,628,886 B2
(45) Date of Patent: Jan. 14, 2014

(54) FUEL CELL SYSTEM

(75) Inventor: Michitaro Itoga, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 293 days.

(21) Appl. No.: 13/029,162

(22) Filed: Feb. 17, 2011

(65) Prior Publication Data

US 2011/0212371 A1    Sep. 1, 2011

(30) Foreign Application Priority Data

Mar. 1, 2010    (JP) .................................. 2010-044455

(51) Int. Cl.
*H01M 8/04*    (2006.01)

(52) U.S. Cl.
USPC ............................ 429/415; 429/414; 429/429

(58) Field of Classification Search
None
See application file for complete search history.

(56) References Cited

U.S. PATENT DOCUMENTS

| | | | | |
|---|---|---|---|---|
| 6,855,444 B2 * | 2/2005 | Morishima et al. | ........... | 429/413 |
| 7,438,535 B2 * | 10/2008 | Morishima | ................... | 417/187 |
| 8,158,297 B2 * | 4/2012 | Ishikawa | ....................... | 429/444 |

FOREIGN PATENT DOCUMENTS

JP    2003-203665    7/2003

* cited by examiner

*Primary Examiner* — John S Maples
(74) *Attorney, Agent, or Firm* — Finnegan, Henderson, Farabow, Garrett & Dunner, LLP (57) ABSTRACT

A fuel cell system includes a fuel cell; a circulating system that circulates and supplies fuel off-gas discharged from the fuel cell to the fuel cell; a pump that pumps a fluid in the circulating system; a discharge valve through which the fluid in the circulating system is discharged to the outside; and a control device that controls the pump and the discharge valve. If operation of the fuel cell is started in a cold environment, the control device executes a control to start power generation in the fuel cell for a first period before activating the pump and executes a control to drive the pump while the discharge valve is closed for a second period.

12 Claims, 4 Drawing Sheets

FUEL CELL SYSTEM

INCORPORATION BY REFERENCE

The disclosure of Japanese Patent Application No. 2010-044455 filed on Mar. 1, 2010 including the specification, drawings and abstract is incorporated herein by reference in its entirety.

BACKGROUND OF THE INVENTION

1. Field of the Invention

The present invention relates to a fuel cell system that is equipped with a fuel gas circulating system.

2. Description of the Related Art

Conventional fuel cell systems generally include a fuel cell, which is supplied with a fuel gas that contains hydrogen and an oxidation gas that contains oxygen, to generate electric power and a means to prevent freezing in a low-temperature environment. For example, in Japanese Patent Application Publication No. 2003-203665 (JP-A-2003-203665), dry air is fed into a flow rate control valve provided in an oxidation gas supply system to blow off water droplets thereon when the fuel cell is stopped.

A conventional fuel cell system may also be provided with a discharge valve in a circulating system, which is used to circulate and supply fuel off gas to a fuel cell with a circulation pump. By opening the discharge valve as needed when the fuel cell system is operating, impurities (nitrogen gas and so on) contained in the fuel off gas may be discharged from the circulating system together with the fuel off gas and the hydrogen concentration in the circulating system is thereby prevented from decreasing. Also, the water (vapor) that is generated through the electrochemical reaction in the fuel cell is actively discharged into the circulating system together with the fuel off gas by the circulation pump and then out of the circulating system through the discharge valve.

In a low-temperature environment below 0° C., if water discharged from the fuel cell into the circulating system adheres to the discharge valve or the inner surfaces of the flow path from the fuel cell to the discharge valve, the water may freeze and cause an opening failure of the discharge valve. In particular, an opening failure of the discharge valve that is caused by freezing of the discharged water tends to occur during startup of the fuel cell because the amount of heat in the generated water is small. Providing a heater that is used to melt frozen parts as a measure against such freezing leads to an increase of equipment and cost for the entire fuel cell system. The measure that is described in JP-A-2003-203665 is not necessarily effective because it does not relate to the time of startup of a fuel cell, when freezing is most likely to occur.

SUMMARY OF THE INVENTION

The present invention provides a fuel cell system that can prevent the discharge valve from being frozen shut during cold start of a fuel cell.

A fuel cell system according to an aspect of the present invention is a fuel cell system that includes: a fuel cell; a circulating system that circulates and supplies fuel off-gas discharged from the fuel cell to the fuel cell; a pump that pumps a fluid in the circulating system; a discharge valve through which the fluid in the circulating system is discharged to the outside; and a control device that controls the pump and the discharge valve, in which, when the fuel cell is started in a cold environment, the control device executes a control to start power generation in the fuel cell for a first period before activating the pump and executes a control to drive the pump while the discharge valve is closed for a second period.

According to the above aspect, water is generated in the fuel cell and the temperature of the water is increased as a result of power generation in the fuel cell in the first period, and the generated water with an increased temperature is discharged from the fuel cell into the circulating system by driving the pump in the second period. Because the temperature of the flow path from the fuel cell to the discharge valve can be increased by the generated water that is discharged, the generated water that is discharged during cold start is prevented from freezing. As a result, opening failure of the discharge valve can be prevented without providing an additional heater or the like.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

A fuel cell system according to one embodiment of the present invention will be described below with reference to the accompanying drawings.

Figure 1:
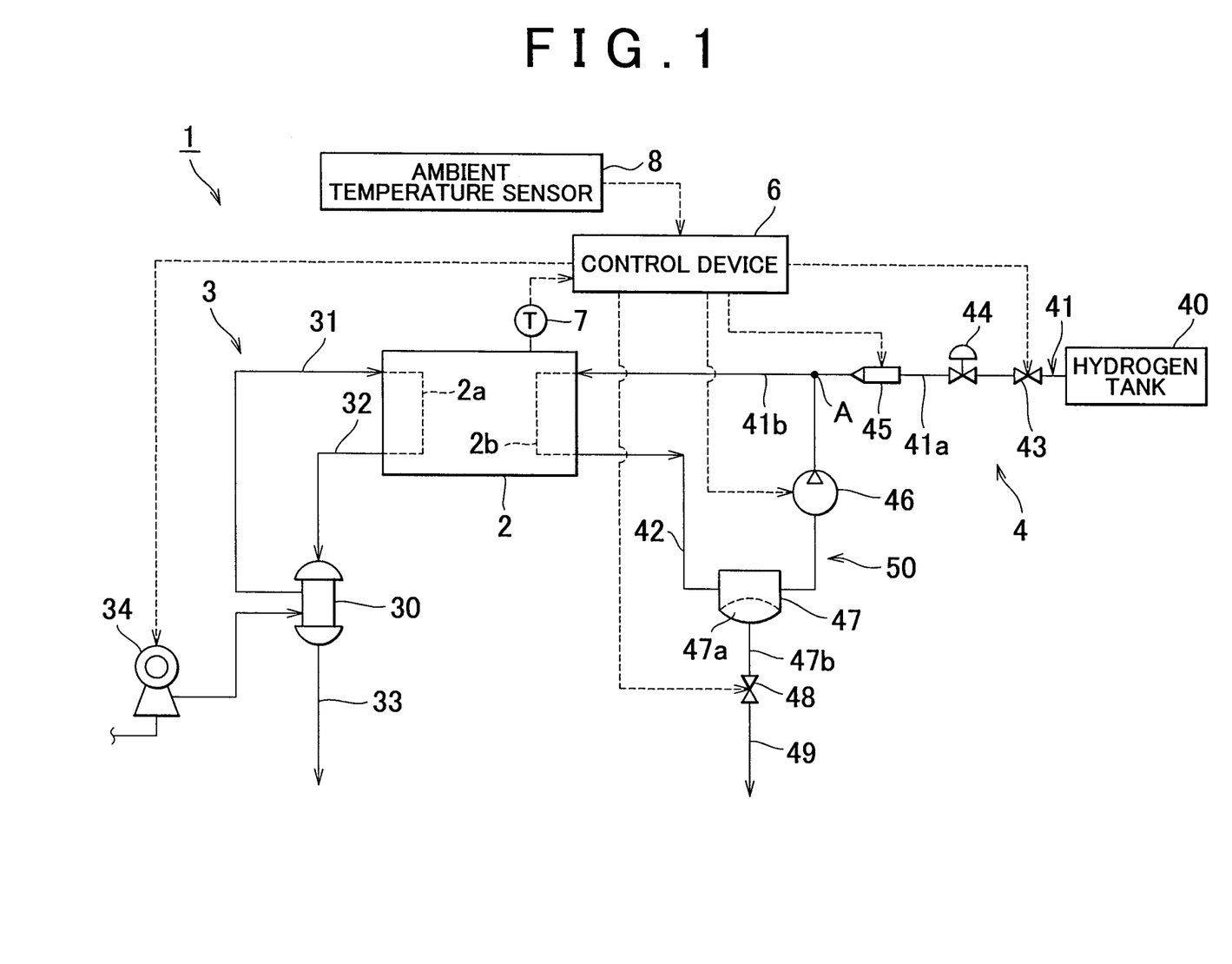
FIG. 1 is a configuration diagram that illustrates a principal part of a fuel cell system according to an embodiment of the present invention.

As shown in FIG. 1, a fuel cell system 1 includes a fuel cell 2, an oxygen gas piping system 3, a fuel gas piping system 4, and a control device 6. The fuel cell system 1, which may be mounted on a vehicle to supply electric power to a traction motor, is applicable to any mobile objects such as boats, airplanes, trains and walking robots in addition to vehicles. The fuel cell system 1 may also be applied to stationary power generation systems that are used as a power generating facility for an architectural structure (residence, building, etc.).

The fuel cell 2 may be a polymer electrolyte type, for example, and has a stack structure in which a plurality of unit cells are stacked on top of each other. A polymer electrolyte type unit cell includes a cathode on one side of an electrolyte that is composed of an ion-exchange membrane, an anode on the other side of the electrolyte, and a pair of separators that sandwich the cathode and anode from both sides. An oxidation gas is supplied to an oxidation gas passage $2a$ of one of the separators and a fuel gas is supplied to a fuel gas passage $2b$ of the other separator. By an electrochemical reaction between the supplied fuel gas and oxidation gas, the fuel cell 2 generates electric power and produces heat. In the case of a polymer electrolyte type, the temperature of the fuel cell 2 (which is hereinafter referred to as "stack temperature") in the range of approximately 60 to 80° C. is suitable for proper operation and is detected by a temperature sensor 7. The electrochemical reaction in the fuel cell 2 generates water on the cathode side in the fuel cell 2. A portion of the water also migrates to the anode side through the electrolyte membrane of the unit cell.

The oxygen gas and fuel gas are collectively referred to as reactant gases. In particular, the oxygen gas and fuel gas that are discharged from the fuel cell 2 are referred to as oxygen off-gas and fuel off-gas, respectively, which are collectively referred to as reaction off-gases. The fuel gas is a gas that contains hydrogen. In the following description, air is shown as an example of the oxygen gas and hydrogen gas is shown as an example of the fuel gas. Also, the fuel off-gas is referred to as "hydrogen off-gas."

The oxygen gas piping system 3 includes a humidifier 30, a supply passage 31, a discharge passage 32, an exhaust gas passage 33, and a compressor 34. The compressor 34 is provided at an upstream end of the supply passage 31. The air (oxygen gas) in the atmosphere that is drawn in by the compressor 34 is pumped through the supply passage 31 to the humidifier 30 and humidified therein, and is then supplied to the fuel cell 2. The oxygen off-gas that is discharged from the fuel cell 2 is introduced into the humidifier 30 through the discharge passage 32 and is then discharged to the outside through the exhaust gas passage 33.

The fuel gas piping system 4 includes a hydrogen tank 40, a supply passage 41, and a circulation passage 42. The hydrogen tank 40 is a hydrogen supply source that stores hydrogen gas under high pressure (for example, 35 MPa or 70 MPa). Alternatively, instead of the hydrogen tank 40, a reformer that generates a hydrogen-rich reformate from a hydrocarbon fuel and a high pressure gas tank that pressurizes the reformate that is generated by the reformer to a high pressure and stores the pressurized reformate may be employed as a hydrogen supply source. Alternatively, a tank that contains a hydrogen storage alloy may be employed instead of the hydrogen tank 40.

The supply passage 41 is used to supply the hydrogen gas in the hydrogen tank 40 to the fuel cell 2, and is constituted by a main stream passage 41a and a mixing passage 41b that are joined at a junction A. The main stream passage 41a is provided with a shutoff valve 43, a regulator 44, and an injector 45. The shutoff valve 43 functions as a root valve of the hydrogen tank 40 and shuts off or permits the supply of hydrogen gas from the hydrogen tank 40 to the fuel cell 2 side. The regulator 44 is a mechanical pressure-reducing valve, for example, and reduces the gas pressure of the hydrogen gas to a predetermined secondary pressure. The injector 45 is an electromagnetically-driven on-off valve and regulates the flow rate and gas pressure of the hydrogen gas that is supplied to the mixing passage 41b side with a high degree of accuracy.

The circulation passage 42 is a return pipe that is used to return the hydrogen off-gas that is discharged from a hydrogen gas outlet of the fuel cell 2 to the supply passage 41. The circulation passage 42 includes a hydrogen pump 46 that pressurizes the hydrogen off-gas in the circulation passage 42 and pumps the hydrogen off-gas to the junction A. At the junction A, new hydrogen gas from the hydrogen tank 40 is mixed to the hydrogen off-gas from the hydrogen pump 46, and the mixed hydrogen gas is then supplied to the fuel cell 2 through the mixing passage 41b. Therefore, the residual hydrogen in the hydrogen off-gas is recirculated to generate power in the fuel cell 2. The hydrogen pump 46 is a type of pump that includes a blower and so on.

The circulation passage 42 is connected to a discharge passage 49 via a gas-liquid separator 47 and a discharge valve 48 that are provided upstream of the hydrogen pump 46. The fluid that flows through the circulation passage 42 contains, in addition to hydrogen off gas, a portion of the generated water that has traversed the electrolyte membrane to the anode side and nitrogen gas. However, the, amount of water and nitrogen gas is minute in comparison with the amount of hydrogen off gas. The gas-liquid separator 47 separates the fluid that is flowing through the circulation passage 42 into liquid and gas, and stores the separated liquid (generated water) in a liquid reservoir 47a. The liquid reservoir 47a is connected to the discharge valve 48 via a connection passage 47b through which fluid can flow, and the liquid in the liquid reservoir 47a is directed into the discharge passage 49 through the connection passage 47b and then discharged to the outside when the discharge valve 48 is opened. When the discharge valve 48 is opened, a portion of the hydrogen off-gas is also directed into the discharge passage 49 and then discharged to the outside. The downstream end of the discharge valve 48 may open directly to the atmosphere or may be connected to a diluter (not shown) or the exhaust gas passage 33.

As described above, the discharge valve 48 functions not only as a drain valve that discharges the generated water in the circulating system 50 to the outside but also as an exhaust valve that discharges the hydrogen off-gas in the circulating system 50 to the outside together with nitrogen gas (impurities). Thus, the generated water in the liquid reservoir 47a and the connection passage 47b may be discharged and the hydrogen concentration in the hydrogen off gas can be increased by opening the discharge valve 48. The circulating system 50 is a system that includes the circulation passage 42 and the mixing passage 41b, and is used to recirculate the hydrogen off-gas to the fuel gas passage 2b of the fuel cell 2.

Figure 2:
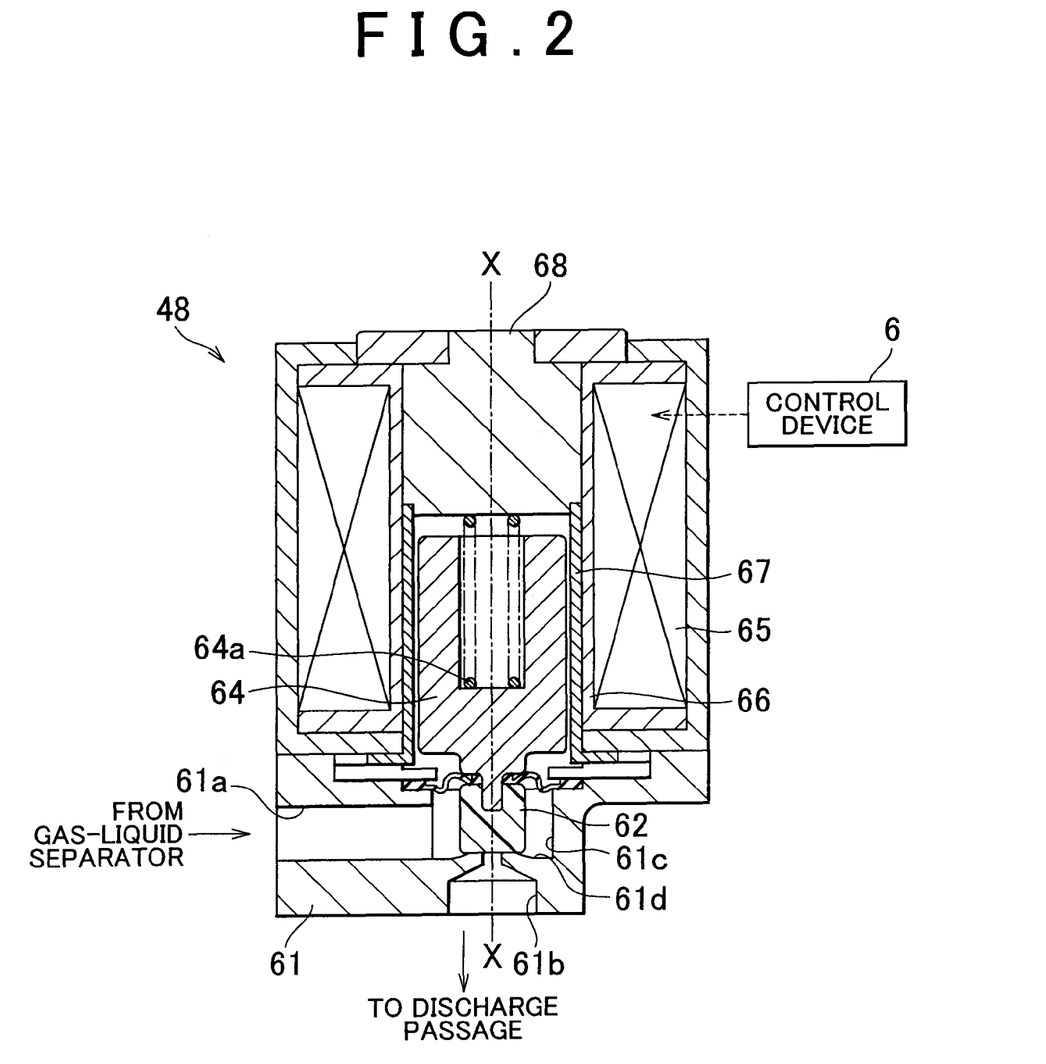
FIG. 2 is a cross-sectional view of a discharge valve according to an embodiment of the present invention.

As shown in FIG. 2, the discharge valve 48 is an electromagnetically-driven on-off valve that has an angle valve structure, for example, and has a valve body 61, a valve seat 61d, a valve element 62, and a plunger 64. In the valve body 61, an inlet channel 61a, an outlet channel 61b, and a valve chamber 61c that connects the inlet channel 61a and the outlet channel 61b are formed. The inlet channel 61a is communicated with the liquid reservoir 47a via the connection passage 47b, and the outlet channel 61b is communicated with the outside via the discharge passage 49. The valve seat 61d is formed on the bottom surface of the valve chamber 61c, and has an opening that is communicated with the outlet channel 61b. The valve element 62 moves in the direction of an axis X-X into contact with and away from the valve seat 61d to open and close the opening of the valve seat 61d, whereby the discharge valve 48 is actuated.

The valve element 62 is secured to one end of the plunger 64, which slides in the direction of the axis X-X along the inner peripheral surface of a sleeve 67. The plunger 64 is urged in a direction away from a center core 68 by a spring 64a. The plunger 64, a coil 65 and an iron core 66 constitute the driving section of a solenoid-type actuator that reciprocates the valve element 62 in the direction of the axis X-X through a prescribed stroke. By controlling the supply of electric power to the coil 65 of the driving section in a binary manner, the discharge valve 48 is basically used in two positions, i.e., "open" and "closed" positions. The switching on and off of the supply of electric power is controlled by a control device 6. As the discharge valve 48, different types of electric valves, such as a motor-operated valve that has a step motor as a driving section, may be used instead of an electromagnetic valve.

The control device 6 includes a microcomputer that comprises a CPU, a ROM, and a RAM. The CPU performs various processing and control functions such as performing a desired calculation according to a control program to control the hydrogen pump 46 and the discharge valve 48 during cold start, which is described later. The ROM stores control programs and control data that are used by the CPU. The RAM is primarily used as various working areas for control processing.

Into the control device 6, the pressures, temperatures and flow rates of the fluids flowing through the piping systems 3 and 4 detected by sensors, the temperature of the environment in which the fuel cell system 1 idetected by an ambient temperature sensor 8, and so on are input in addition to the temperature detected by the temperature sensor 7. The control device 6, based on the information detected by the sensors, controls the compressor 34, the shutoff valve 43, the injector 45, the hydrogen pump 46, the discharge valve 48, and so on. Through these control operations, reactant gases with a flow rate and a pressure that correspond to a requested power generation amount are supplied to the fuel cell 2 and the discharge valve 48 is actuated to clean the inside of the circulating system 50 during normal operation of the fuel cell system 1.

The temperature sensor 7, which may directly detect the temperature of the inside or a component of the fuel cell 2, is constituted of a sensor that detects the temperature of a coolant (such as cooling water) that is circulated in the fuel cell 2. Specifically, the fuel cell system 1 includes a coolant piping system (not shown) that circulates coolant through the fuel cell 2, and the temperature sensor 7 is provided on the side of a coolant outlet of the fuel cell 2 in the refrigerant piping system. The coolant temperature detected by the temperature sensor 7 substantially reflects the temperature of the fuel cell 2 (stack temperature). Therefore, the control device 6 recognizes the coolant temperature detected by the temperature sensor 7 as the stack temperature.

Figure 3:
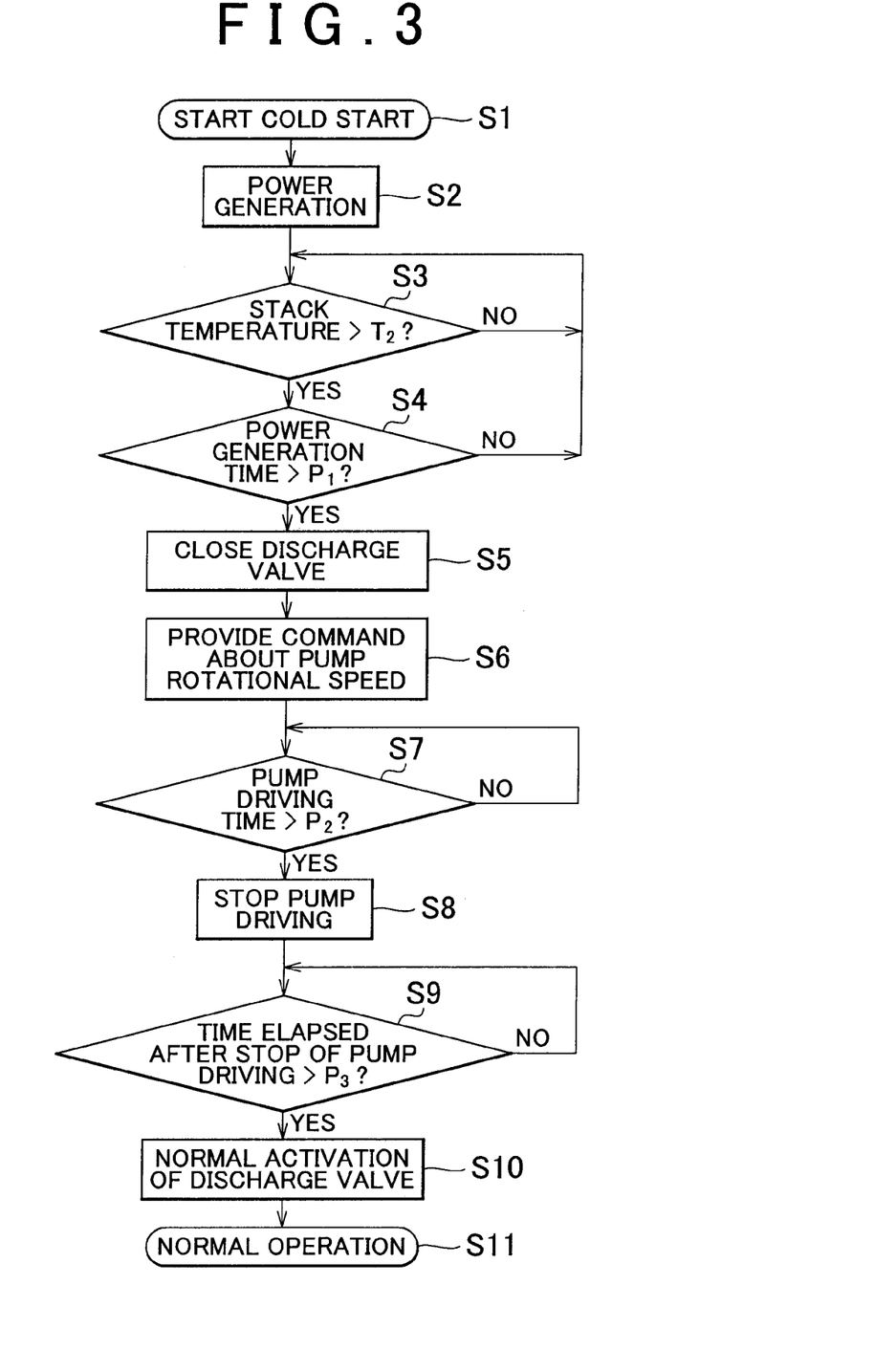
FIG. 3 is a flowchart that shows the control operations that are performed during a cold start of the fuel cell system according to an embodiment of the present invention.
Figure 4:
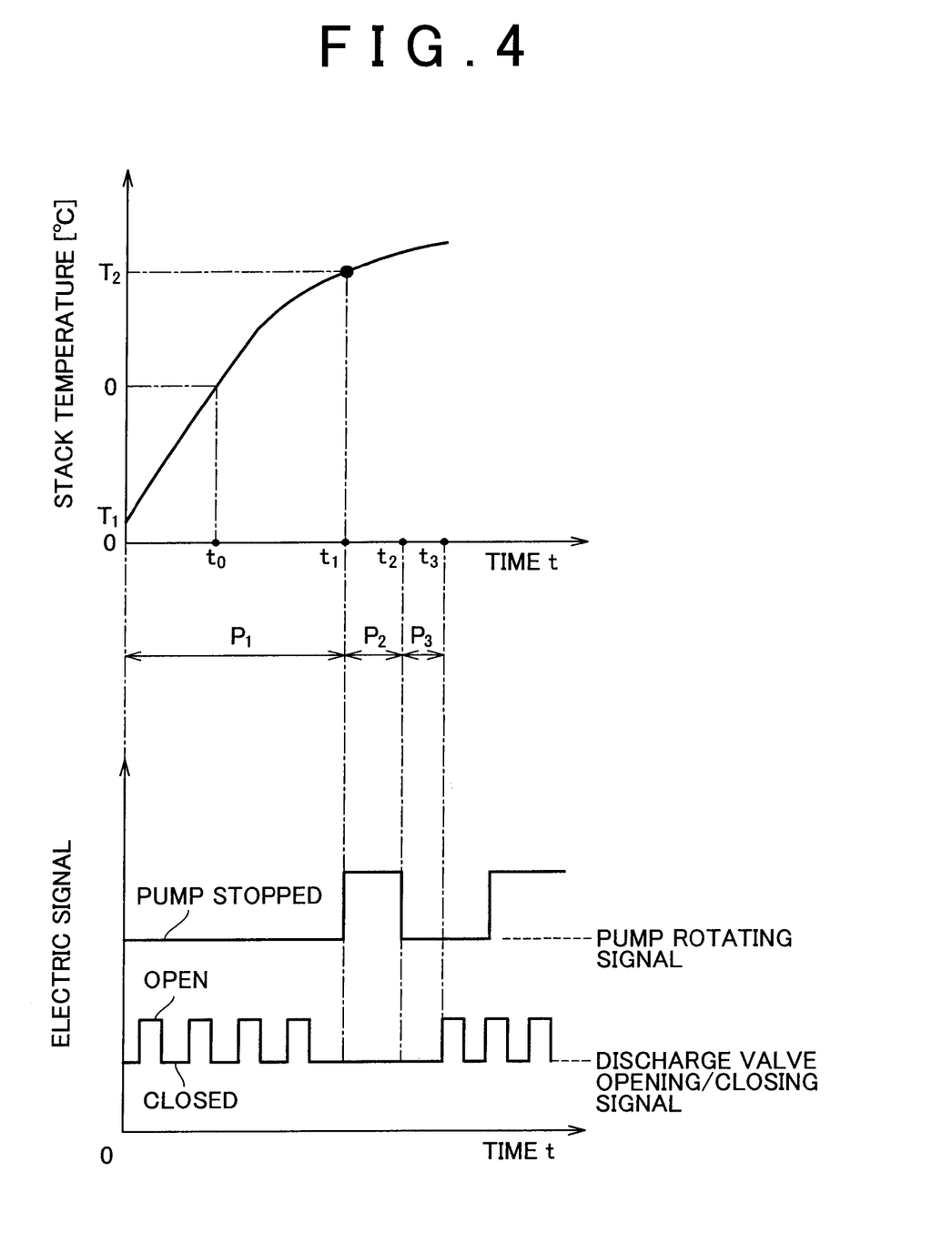
FIG. 4 is a graph that shows the relationship between the temperature of the fuel cell and time during cold start of the fuel cell system according to an embodiment of the present invention, and a timing chart that shows the pump driving timing and the open/close timing of the discharge valve during the cold start.

Referring next to FIG. 3 and FIG. 4, the control operations that are executed during a cold start of the fuel cell system 1 is described. The control operations executed during the cold start of the fuel cell system 1 are performed if the environment around the fuel cell system 1 is at a prescribed low temperature when the fuel cell 2 starts power generation, that is, when the fuel cell 2 is activated. Whether or not the environment is at a prescribed low temperature is determined by the control device 6 based on the temperature information that is detected by the temperature sensor 7 or the ambient temperature sensor 8. For example, it is determined that the environment is at a prescribed low temperature when a temperature that is lower than a reference value, such as 0° C., at which water starts freezing, a temperature on the safer side (such as 2° C.), or a temperature that is lower than 0° C., is detected. Here, an example in which the "prescribed temperature" is set to a temperature that is below 0° C. is described.

As shown in FIG. 4, in a low-temperature environment where the stack temperature $T_1$ at the time of start-up of the fuel cell 2 (t=0) is below 0° C., the control device 6 reads out the flowchart that is shown in FIG. 3. When the flowchart shown in FIG. 3 is read out, cold start of the fuel cell system 1 is started (step S1). Then, the supply of oxygen gas and hydrogen gas to the fuel cell 2 is started and the fuel cell 2 starts generating power (step S2).

As described above, water formed on the cathode side of the fuel cell 2 as a result of the power generation in the fuel cell 2, and a portion of the water migrates to the anode side. A portion of the generated water that has migrated to the anode side is present as water droplets in the fuel gas passage 2b.

When the fuel cell 2 is started after it has been left for extended period of time since the last operation, the temperature that is detected by the ambient temperature sensor 8 is equal to the temperature that is detected by the temperature sensor 7, and is equal to the stack temperature $T_1$.

A first period $P_1$ ($0 < t \le t_1$) that is shown in FIG. 4 is described. As shown in FIG. 4, when time to elapses after the start of power generation, the increased stack temperature has increased to 0° C. The reason why the stack temperature increases is that the power generation in the fuel cell 2 involves an exothermic reaction as described before. Thereafter, the stack temperature will continue to increase with the progress of power generation. In the period $P_1$ before the stack temperature reaches a temperature $T_2$ ($T_2 > 0$) and the power generation time reaches time $t_1$, the hydrogen pump 46 is not driven. Also, during this period $P_1$, the discharge valve 48 is actuated as needed, and, in the example shown in FIG. 4, the discharge valve 48 is opened a total of four times. Each time the discharge valve 48 is opened, nitrogen gas in the circulating system 50 is discharged to the outside together with the hydrogen off-gas. Steps S3 and S4, executed as control operations in FIG. 3, correspond to the period $P_1$.

During the period $P_1$, water droplets (generated water) in the fuel gas passage 2b are not actively discharged into the circulation passage 42 and remain in the fuel gas passage 2b because the hydrogen pump 46 is not driven. Also, in the period $P_1$, the amount and temperature of the generated water in the fuel gas passage 2b increases because the fuel cell 2 is in the process of power generation. In other words, the amount of heat in the generated water in the fuel gas passage 2b increases with the lapse of time.

A second period $P_2$ ($t_1 \le t < t_2$) that is shown in FIG. 4 is described. As shown in FIG. 4, at time $t_1$ when the second period $P_2$ starts, driving of the hydrogen pump 46 is started. When a given period of time (i.e., the period $P_2$) elapses after the start, driving of the hydrogen pump 46 is stopped. While the hydrogen pump 46 is driven, the discharge valve 48 remains closed.

Thus, as control operations in FIG. 3 that correspond to the period $P_1$, the discharge valve 48 is first so controlled as to maintain a closed state (step S5). Then, a command about a rotational speed is provided to the hydrogen pump 46 to start the driving of the hydrogen pump 46 (step S6), and the hydrogen pump 46 is continuously driven until the given period $P_2$ has elapsed (step S7). These control operations are executed by the control device 6.

Here, in the period $P_2$, the generated water that has been accumulated in the fuel gas passage 2b is actively or forcibly discharged together with the hydrogen off-gas into the circulation passage 42 because the hydrogen pump 46 is driven. After that, the generated water is pumped together with the hydrogen off-gas to the gas-liquid separator 47 and separated from gas in the gas-liquid separator 47. After separation, the water is held in the liquid reservoir 47a, the connection passage 47b and the valve chamber 61c. Because the amount of heat in the generated water has been increased during the period $P_1$ as described above, the temperature of the flow path from the fuel cell 2 to the discharge valve 48 (including a part of the circulation passage 42 and the connection passage 47b) is increased by the generated water in the period $P_2$. The temperature of the valve element 62 of the discharge valve 48 in a closed state is also increased by the generated water.

Thus, it is desirable that the timing of starting the driving of the hydrogen pump 46 is determined based on the fact that the generated water that is discharged from the fuel cell 2 has a sufficient amount of heat to increase the temperature the flow path from the fuel cell 2 to the discharge valve 48 sufficiently to prevent it from freezing. From another point of view, it is desirable that prescribed values as references for transition from the period $P_1$ to the period $P_2$, that is, the temperature $T_2$ and the time $t_1$ are set to values at which the amount of heat in the generated water that is derived from the stack temperature and the amount of generated water is sufficiently large to increase the temperature of the flow path from the fuel cell 2 to the discharge valve 48 from a temperature below zero to a temperature at which the generated water is prevented from freezing (such as 0° C.). These setting can be made through a preliminary evaluation or simulation.

As for the passage design of the flow path from the fuel cell 2 to the discharge valve 48, it is desirable, in contrast to the above, that the passage is so designed that the temperature thereof is increased from a temperature below zero to a non-freezing temperature by the heat from the generated water that is discharged from the fuel cell 2. For example, if a pipe is employed, it is desirable that the heat capacity (which is attributed to the length and material) and surface area of the pipe are used as parameters.

By performing the above control operations, it is possible to prevent the generated water discharged from the fuel cell 2 during cold start from freezing. Also, because prompt transition to the period $P_2$ can be achieved when the timing to start driving the hydrogen pump 46 is optimized, the time that is necessary to increase the temperature of the flow path from the fuel cell 2 to the discharge valve 48 may be minimized.

A third period $P_3$ ($t_2 \leq t < t_3$) that is shown in FIG. 4 is described. As shown in FIG. 4, at the time $t_2$ when the second period $P_3$ starts, driving of the hydrogen pump 46 is stopped. In this period $P_3$, the hydrogen pump 46 is not driven and the discharge valve 48 remains closed. Steps S8 and S9, shown in FIG. 3, are the control operations executed during the period $P_3$.

In the period $P_3$, the temperature of the flow path from the fuel cell 2 to the discharge valve 48 and that of the discharge valve 48 is increased by the generated water. In particular, in the period $P_3$, the temperature of the connection passage 47b and the valve chamber 61c is increased by the generated water that has already reached the connection passage 47b and the valve chamber 61c. In addition, the temperature of the connection passage 47b and the valve chamber 61c can be increased by the generated water that is delivered into the connection passage 47b and the valve chamber 61c by a residual pressure in the circulating system 50 or gravity in the period $P_3$ even if the hydrogen pump 46 is not operating. By providing the period $P_3$ as described above, sufficient time to increase the temperature of the flow path from the fuel cell 2 to the discharge valve 48 and the discharge valve 48 (in particular, the valve element 62) can be secured more reliably.

Here, it is desirable to take suction of generated water into the hydrogen pump 46, as well as the driving amount (rotational speed and rotation time) of the hydrogen pump 46 that can discharge the generated water that has a required amount of heat from the fuel cell 2, into consideration when the timing of stopping the driving of the hydrogen pump 46 (i.e., time $t_2$) is determined. Specifically, if the hydrogen pump 46 continues to be driven when the amount of generated water in the gas-liquid separator 47 exceeds the capacity of the liquid reservoir 47a, the excess water may be drawn into the hydrogen pump 46. If this occurs, the hydrogen pump 46 may become locked or the unit cells in the fuel cell 2 may become clogged with water. Thus, in view of this, it is desirable to set the timing of stopping the driving of the hydrogen pump 46 so that the hydrogen pump 46 is stopped at least the timing when the generated water that has been discharged from the fuel cell 2 does not exceed the capacity of the liquid reservoir 47a. This setting can be made through a preliminary evaluation or simulation.

After that, as shown in FIG. 4, the discharge valve 48 opens at time $t_3$ when the third period $P_3$ ends. As a result, the generated water in the liquid reservoir 47a is discharged into the discharge passage 49 together with the generated water in the connection passage 47b and the discharge valve 48. At this point in time, the hydrogen pump 46 is still stopped. Thereafter, as normal operation, the discharge valve 48 is repeatedly opened and closed and the hydrogen pump 46 is restarted.

Thus, as shown in FIG. 3, normal activation (repetitive opening and closing) of the discharge valve 48 is first carried out (step S10) after the time $t_3$. Then, in the fuel cell system 1, normal operation commences (step S11). During normal operation, reactant gases with a flow rate and a pressure that correspond to a requested power generation amount are supplied to the fuel cell 2, the hydrogen pump 46 is driven, and the discharge valve 48 is opened and closed as needed.

Here, it is desirable to set the timing of normal activation of the discharge valve 48 (that is, the time $t_3$) so that the discharge valve 48 is activated when the temperature of the flow path from the fuel cell 2 to the discharge valve 48 and the discharge valve 48 has reached a prescribed temperature (such as 0° C.). This setting can be also made through a preliminary evaluation or simulation.

It is also desirable to adjust the rotational speed of the hydrogen pump 46 when the normal operation is started or during the normal operation to one that is higher than the rotational speed of the hydrogen pump 46 during the second period $P_2$. This reason is that the operating noise (NV) of the hydrogen pump 46 during the period $P_2$ cannot be reduced, if, in contrast to the above, the rotational speed of the hydrogen pump 46 during the period $P_2$ is adjusted based on the rotational speed during the normal operation.

As for the lengths of the periods $P_1$ to $P_3$, the period $P_3$ is shorter than both the period $P_1$ and period $P_2$, and the period $P_2$ is shorter than the period $P_1$. The power generation in the fuel cell 2 is also continued after the period $P_1$.

As described above, according to the fuel cell system 1 of this embodiment, the temperature of the flow path from the fuel cell 2 to the discharge valve 48 and the discharge valve 48 may be increased using the water generated in the fuel cell 2 during a cold start. It is, therefore, possible to prevent opening failure of the discharge valve 48 due to freezing of generated water that is discharged during cold start without providing an additional device such as a heater.

In particular, if driving of the hydrogen pump 46 starts simultaneously with the start of power generation, generated water that has only a small amount of heat may flow into the flow path from the fuel cell 2 to the discharge valve 48 and freeze if the temperature is below zero. In contrast, according to this embodiment, freezing may be prevented because the hydrogen pump 46 is not driven until the generated water has a prescribed amount of heat.

If the discharge valve 48 is opened in the second period $P_2$, the temperature of the discharge valve 48 may not be sufficiently increased by the generated water. In contrast, according to this embodiment, because the discharge valve 48 is kept closed during the second period $P_2$, the generated water more effectively increases the temperature of the discharge valve 48.

If the condition under which the control operations during a cold start, as shown in FIG. 3 and FIG. 4, are performed is not satisfied, that is, if the environmental temperature around the fuel cell system 1 exceeds a threshold temperature when the fuel cell 2 is activated, normal operation is performed (FIG. 3: step S11).

In another embodiment, the discharge valve 48 may function only as an exhaust valve and may not mainly function as a drain valve as long as the generated water can be fed into the flow path from the fuel cell 2 to the discharge valve 48. (for US)

According to the above embodiment of the present invention, it is possible to provide a fuel cell system that prevents a discharge valve from being frozen shut when the fuel cell is stared in a cold environment.

A fuel cell system according to this embodiment includes: a fuel cell; a circulating system that circulates and supplies fuel off-gas discharged from the fuel cell to the fuel cell; a pump that pumps a fluid in the circulating system; a discharge valve through which the fluid in the circulating system is discharged to the outside; and a control device that controls the pump and the discharge valve, in which, when the fuel cell is started in a cold environment, the control device executes a control to start power generation in the fuel cell for a first period before activating the pump and executes a control to drive the pump while the discharge valve is closed for a second period.

Therefore, according to this embodiment, water is generated in the fuel cell and the temperature of the water is increased as a result of power generation in the fuel cell in the first period, and the generated water with an increased temperature is discharged from the fuel cell into the circulating system by driving the pump in the second period. Because the temperature of the flow path from the fuel cell to the discharge valve may be increased by the generated water that is discharged, the generated water that is discharged during cold start is prevented from freezing. As a result, opening failure of the discharge valve can be prevented without providing an additional heater or the like.

In the fuel cell system according to this embodiment, after the second period, the control device may execute a control to stop the pump while keeping the discharge valve closed for a third period. It is, therefore, possible to secure sufficient time to increase the temperature of the flow path from the fuel cell to the discharge valve and prevent suction of the generated water into the pump. For example, when a case where a gas-liquid separator in which the generated water from the fuel cell is stored is provided and the generated water that is stored is discharged out of the circulating system by opening of the discharge valve is supposed, the generated water is sucked into the pump if driving of the pump is continued when the amount of the generated water exceeds the capacity of the gas-liquid separator. On the contrary, according to this embodiment, the suction of generated water into the pump as described above can be prevented.

In the fuel cell system according to this embodiment, after the third period, the control device may restart the driving of the pump after opening the discharge valve. With this arrangement, because the driving of the pump can be restarted after the generated water in the circulating system is discharged to the outside, suction of generated water into the pump can be prevented more reliably.

In the fuel cell system according to this embodiment, the rotational speed at which the pump is driven in the second period may be lower than the rotational speed at which driving of the pump is restarted after the third period. With this arrangement, the NV (noise) during the second period may be reduced.

In the fuel cell system according to this embodiment, the control device may provide a transition from the first period to the second period after the temperature of the fuel cell and the power generation time reach prescribed values. Because the amount of heat in the generated water can be known from the temperature of the fuel cell and the power generation time, if the values of the temperature of the fuel cell and the power generation time (prescribed values) that correspond to the amount of heat which can prevent freezing in the flow path from the fuel cell to the discharge valve are obtained in advance, a prompt transition to the second period can be achieved when the prescribed values are reached. With this arrangement, the length of the first period can be made appropriate, and the time that is necessary to increase the temperature of the flow path from the fuel cell to the discharge valve can be shortened as much as possible.

In the fuel cell system according to this embodiment, the control device may open and close the discharge valve in the first period. With this arrangement, it is possible to discharge impurities in the circulating system out of the circulating system through the discharge valve and prevent a decrease in the fuel concentration in the circulating system.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A fuel cell system, comprising:
   a fuel cell;
   a circulating system that circulates and supplies fuel off-gas discharged from the fuel cell to the fuel cell;
   a pump that pumps a fluid in the circulating system;
   a discharge valve through which the fluid in the circulating system is discharged to the outside; and
   a control device that controls the pump and the discharge valve,
   wherein the control device is configured such that, when the fuel cell is started in a cold environment, the control device
   executes a control to start power generation in the fuel cell for a first period before activating the pump, and
   executes a control to drive the pump while the discharge valve is closed for a second period.

2. The fuel cell system according to claim 1, wherein, after the second period, the control device is configured to execute a control to stop the pump while keeping the discharge valve closed for a third period.

3. The fuel cell system according to claim 2,
   wherein the circulating system comprises a flow path from the fuel cell to the discharge valve, and
   the third period ends when the temperature of both the flow path and the discharge valve reaches a prescribed temperature.

4. The fuel cell system according to claim 2, wherein, after the third period, the control device is configured to restart the driving of the pump after opening the discharge valve.

5. The fuel cell system according to claim 4, wherein the rotational speed at which the pump is driven in the second period is lower than the rotational speed at which driving of the pump is restarted after the third period.

6. The fuel cell system according to claim 2, wherein the third period is shorter than the first period or the second period.

7. The fuel cell system according to claim 1, wherein the second period is shorter than first period.

8. The fuel cell system according to claim 1, wherein the control device is configured to provide a transition from the first period to the second period after the temperature of the fuel cell and the power generation time reach prescribed values.

9. The fuel cell system according to claim 8, wherein the prescribed values are set so that the amount of heat in generated water is sufficient to increase the temperature of the flow path from the fuel cell to the discharge valve to a temperature at which the generated water is prevented from freezing as the generated water passes through the flow path.

10. The fuel cell system according to claim 1, wherein the control device is configured to open and close the discharge valve during the first period.

11. The fuel cell system according to claim 1,
wherein the circulating system further comprises a gas-liquid separator that separates water from the fuel off-gas and stores the water, and
the discharge valve discharges the water stored in the gas-liquid separator, together with the fuel off-gas, when opened.

12. The fuel cell system according to claim 11, wherein the second period is ended and the pump is stopped before the amount of water stored in the gas-liquid separator exceeds a water storage capacity of the gas-liquid separator.

* * * * *